United States Patent
Chatterjee et al.

(10) Patent No.: US 6,898,736 B2
(45) Date of Patent: May 24, 2005

(54) DYNAMIC SIZING LOGIC FOR DUMP LIST GENERATION

(75) Inventors: Anirban Chatterjee, Austin, TX (US); Michael Youhour Lim, Leander, TX (US); Stuart Allen Werbner, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 499 days.

(21) Appl. No.: 10/001,749

(22) Filed: Oct. 31, 2001

(65) Prior Publication Data

US 2003/0084374 A1 May 1, 2003

(51) Int. Cl.[7] .............................................. G04F 11/00
(52) U.S. Cl. .......................................... 714/37; 714/45
(58) Field of Search ..................................... 714/37, 45

(56) References Cited

U.S. PATENT DOCUMENTS 6,681,348 B1 * 1/2004 Vachon ......................... 714/45

2002/0010882 A1 * 1/2002 Yamashita ..................... 714/45

FOREIGN PATENT DOCUMENTS

JP          11-31092      * 2/1999    ........... G06F/11/34

* cited by examiner

Primary Examiner—Bryce P. Bonzo
(74) Attorney, Agent, or Firm—Duke W. Yee; Mark E. McBurney; Cathrine K. Kinslow

(57) ABSTRACT

An improved process for executing a dump is provided. The iteration loops are made "smart" by allowing them to determine how big the arrays are on the fly and adjust their behavior accordingly. The process uses a function to calculate the amount of memory to allocate for the dump list based on the dump mode and array sizes. Thus, if the static arrays are modified to add or delete constants or the diagnostic code is in an abbreviated dump mode, the amount of memory to be allocated will be calculated accurately.

19 Claims, 2 Drawing Sheets

DYNAMIC SIZING LOGIC FOR DUMP LIST GENERATION

BACKGROUND OF THE INVENTION

1. Technical Field

The present invention relates to data processing systems and, in particular, to performing a scan dump in the event of a system error. Still more particularly, the present invention provides a method, apparatus, and program for dynamically sizing and allocating memory for dump list generation.

2. Description of Related Art

Some servers use diagnostic code to indicate failing components in the event of a system error. In many cases, however, these diagnostic codes are not sufficient to determine the nature of the failure. In these cases, selected chip data is saved in the event of a failure. Engineers may use this data to determine machine state and further diagnose the problem.

The process of saving this chip data is called a scan dump. The data, referred to as scan data, may contain various hardware dump information elements, such as scan ring, trace array, cache contents, and cache directory contents. During a complete dump the total dump set is dumped. However, depending on the error condition or user configuration, the system may decide to dump only a portion of the total dump set. This is referred to as an abbreviated dump.

When a dump is executed, the diagnostic code allocates memory for a dump list. The diagnostic code then builds the table and includes a list of hardware dump information elements to be collected based on the type of dump to be performed. To do this, the dump routine maintains a set of static arrays containing constants, each of which represents a scan ring or trace array, for example, to be dumped. The routine then iterates through the arrays to build the scan dump list. Another function is called for every entry in the dump list. This function collects hardware dump data and saves it into memory.

This process of executing a dump has several disadvantages. The process has multiple points of maintenance. If the static arrays are modified, for example a particular array is made bigger or smaller by adding or deleting constants, the iteration loops break because the information they have on how many entries they have to iterate through is inaccurate. In addition, the amount of memory allocated for the dump list is calculated using a predefined constant. The function used to allocate memory space for the list would have to be updated every time the number of possible dump list entries is changed.

Furthermore, the above process of executing a dump may result in memory waste. The function used to allocate memory space determines an amount of memory that would be needed for a complete dump. However, there may be several abbreviated dump modes that do not require nearly as much space. Therefore, if the diagnostic code is in one of the abbreviated dump modes, the process may allocate much more memory than is actually used.

Thus, it would be advantageous to provide an improved method, apparatus, and program for dynamically sizing and allocating memory for dump list generation.

SUMMARY OF THE INVENTION

The present invention provides an improved process for executing a dump. The iteration loops are made "smart" by allowing them to determine how big the arrays are on the fly and adjust their behavior accordingly. The process uses a function to calculate the amount of memory to allocate for the dump list based on the dump mode and array sizes. Thus, if the static arrays are modified to add or delete constants or the diagnostic code is in an abbreviated dump mode, the amount of memory to be allocated will be calculated accurately.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
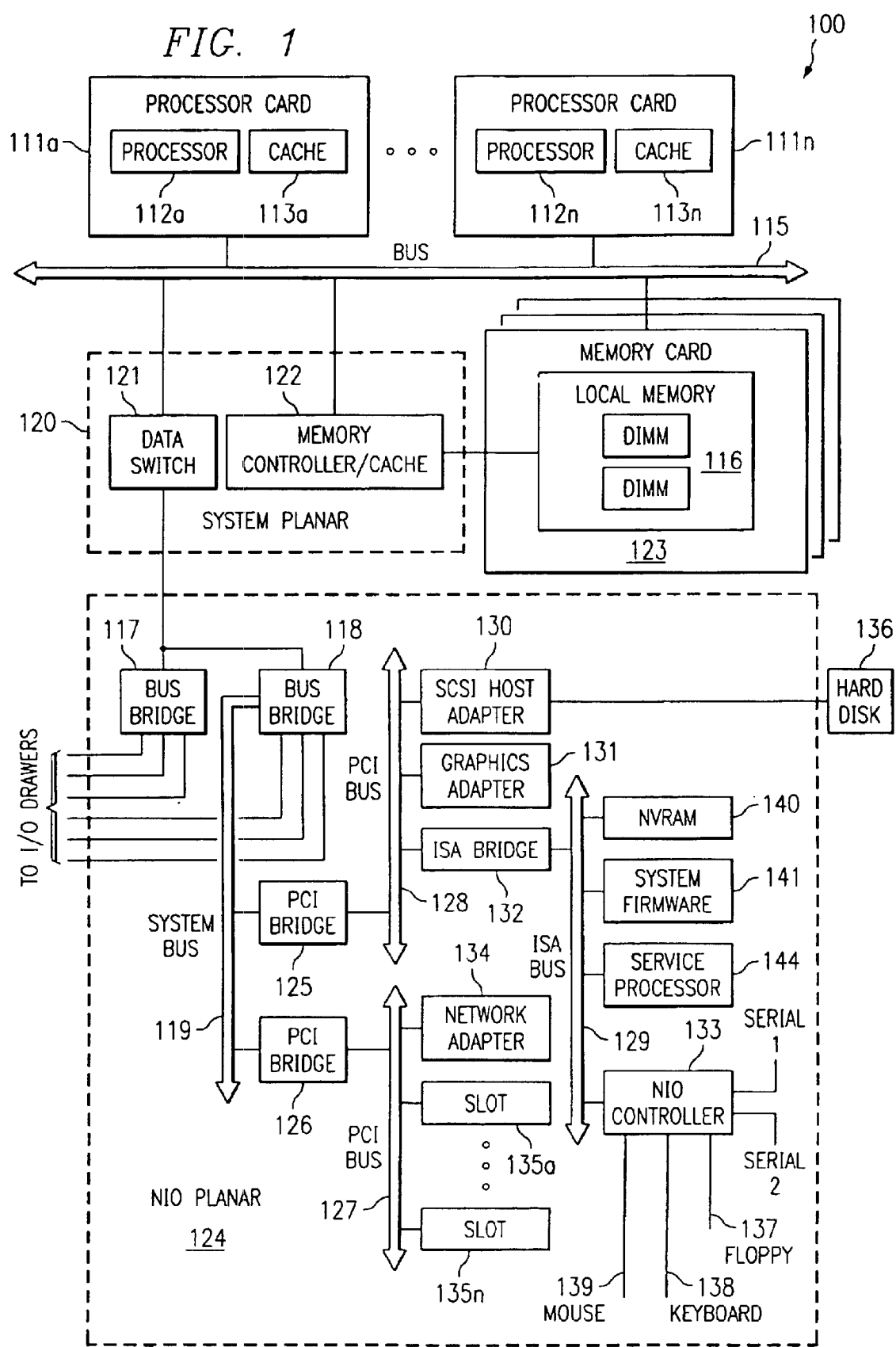
FIG. 1 depicts a block diagram of an illustrative embodiment of a data processing system with which the present invention may advantageously be utilized.

Referring now to the drawings and in particular to FIG. 1, there is depicted a block diagram of an illustrative embodiment of a data processing system with which the present invention may advantageously be utilized. As shown, data processing system 100 includes processor cards 111a–111n. Each of processor cards 111a–111n includes a processor and a cache memory. For example, processor card 111a contains processor 112a and cache memory 113a, and processor card 111n contains processor 112n and cache memory 113n.

Processor cards 111a–111n are connected to main bus 115. Main bus 115 supports a system planar 120 that contains processor cards 111a–111n and memory cards 123. The system planar also contains data switch 121 and memory controller/cache 122. Memory controller/cache 122 supports memory cards 123 that includes local memory 116 having multiple dual in-line memory modules (DIMMs).

Data switch 121 connects to bus bridge 117 and bus bridge 118 located within a native I/O (NIO) planar 124. As shown, bus bridge 118 connects to peripheral components interconnect (PCI) bridges 125 and 126 via system bus 119. PCI bridge 125 connects to a variety of I/O devices via PCI bus 128. As shown, hard disk 136 may be connected to PCI bus 128 via small computer system interface (SCSI) host adapter 130. A graphics adapter 131 may be directly or indirectly connected to PCI bus 128. PCI bridge 126 provides connections for external data streams through network adapter 134 and adapter card slots 135a–135n via PCI bus 127.

An industry standard architecture (ISA) bus 129 connects to PCI bus 128 via ISA bridge 132. ISA bridge 132 provides interconnection capabilities through NIO controller 133 having serial connections Serial 1 and Serial 2. A floppy drive connection 137, keyboard connection 138, and mouse connection 139 are provided by NIO controller 133 to allow data processing system 100 to accept data input from a user via a corresponding input device. In addition, non-volatile RAM (NVRAM) 140 provides a non-volatile memory for preserving certain types of data from system disruptions or system failures, such as power supply problems. A system firmware 141 is also connected to ISA bus 129 for implementing the initial Basic Input/Output System (BIOS) functions. A service processor 144 connects to ISA bus 129 to provide functionality for system diagnostics or system servicing.

The operating system (OS) is stored on hard disk 136, which may also provide storage for additional application software for execution by data processing system. NVRAM 140 is used to store system variables and error information for field replaceable unit (FRU) isolation. During system startup, the bootstrap program loads the operating system and initiates execution of the operating system. To load the operating system, the bootstrap program first locates an operating system kernel type from hard disk 136, loads the OS into memory, and jumps to an initial address provided by the operating system kernel. Typically, the operating system is loaded into random-access memory (RAM) within the data processing system. Once loaded and initialized, the operating system controls the execution of programs and may provide services such as resource allocation, scheduling, input/output control, and data management.

The present invention may be executed in a variety of data processing systems utilizing a number of different hardware configurations and software such as bootstrap programs and operating systems. The data processing system 100 may be, for example, a stand-alone system or part of a network such as a local-area network (LAN) or a wide-area network (WAN).

Diagnostic code may execute on service processor 144 to indicate failing components in the event of a system error. The diagnostic code may be stored in system firmware 141. The diagnostic code may execute a dump process to save diagnostic data from chips in the system, such as processors 112a, 112n and memory controller/cache 122. In accordance with a preferred embodiment of the present invention, the diagnostic code dynamically calculates the amount of memory to allocate for a dump list based on the dump mode and array sizes.

The data processing system illustrated in FIG. 1 is an example of a data processing system on which the present invention may be implemented. Those of ordinary skill in the art will appreciate that the hardware depicted in FIG. 1 may vary. For example, rather than the single memory controller/cache 122, the data processing system may include a memory controller/cache on each memory card 123. The depicted example is not meant to imply architectural limitations with respect to the present invention.

Figure 2:
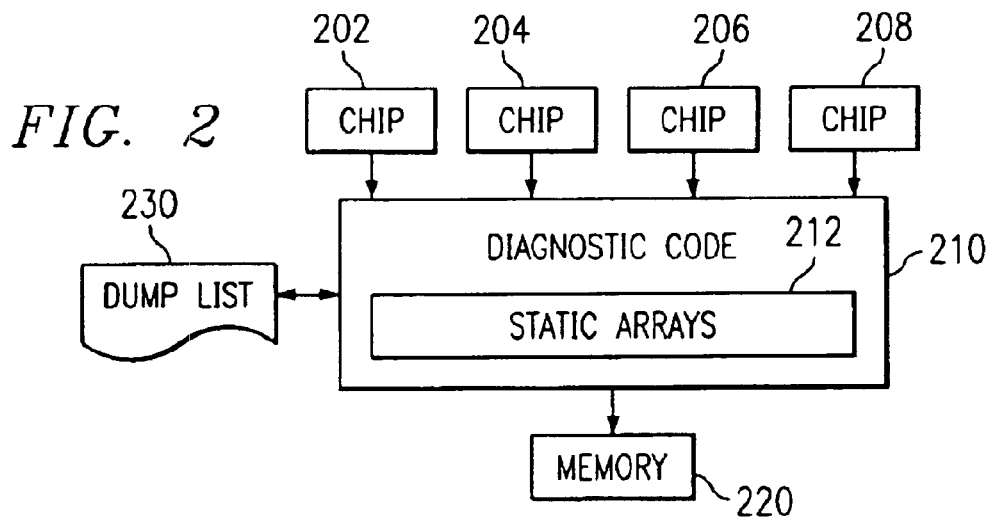
FIG. 2 is a block diagram illustrating a hardware dump process in accordance with a preferred embodiment of the present invention.

With reference now to FIG. 2, a block diagram illustrating a hardware dump process is shown in accordance with a preferred embodiment of the present invention. Diagnostic code 210 indicates failing components in the event of a system error. The diagnostic code determines a dump mode and array sizes for the dump mode based on static arrays 212 maintained in the diagnostic code.

One static array is maintained for each type of component to be scanned. For example, if the dump mode calls for the diagnostic code to receive dump data from three processors and three memory controllers, static arrays 212 include a static array for processors and a static array for memory controllers. Each static array includes a constant for each hardware dump information element to be collected.

Based on the dump mode, diagnostic code 210 determines how many components are to be scanned, which static arrays correspond to the components, and which hardware dump information elements are to be scanned. Using this information, the diagnostic code determines the number and size of arrays to include in dump list 230 and, thus, calculates the amount of memory to allocate for the dump list in memory 220.

Thereafter, the diagnostic code builds dump list 230 that includes a list of hardware information elements to be collected, such as scan rings, trace arrays, cache contents, and cache directory contents. The diagnostic code iterates through the arrays to build the dump list. Another function is called for every entry in the dump list. This function collects the hardware dump data from chips, such as chips 202, 204, 206, 208, and saves it in memory 220.

Figure 3:
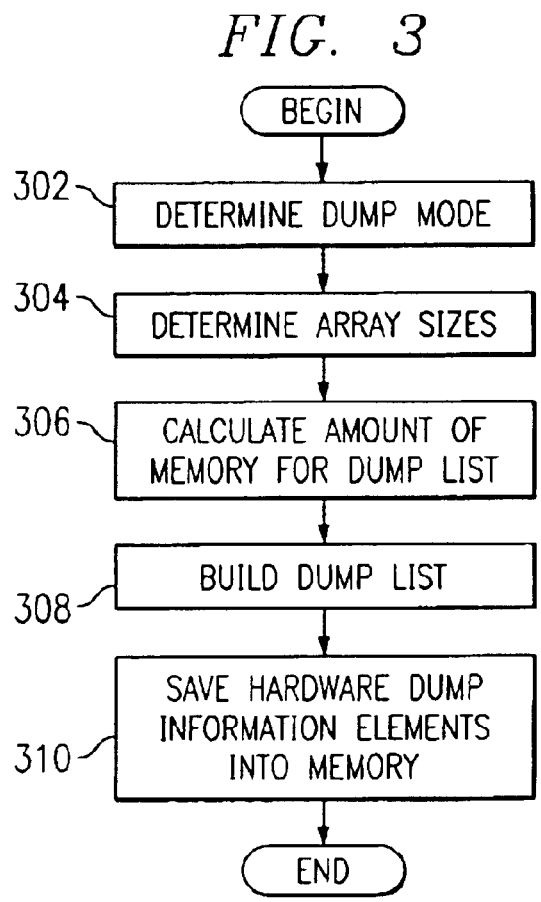
FIG. 3 is a flowchart illustrating the execution of a dump in accordance with a preferred embodiment of the present invention.

Turning now to FIG. 3, a flowchart is shown illustrating the execution of a dump in accordance with a preferred embodiment of the present invention. The process begins, determines the dump mode (step 302), and determines array sizes (step 304). Next, the process calculates the amount of memory for the dump list (306) and builds the dump list (step 308). Thereafter, the process saves the hardware dump information elements into memory (step 310) and ends.

Thus, the present invention solves the disadvantages of the prior art by providing an improved process for executing a dump. The iteration loops are made "smart" by allowing them to determine how big the arrays are on the fly and adjust their behavior accordingly. The process uses a function to calculate the amount of memory to allocate for the dump list based on the dump mode and array sizes. Therefore, if the static arrays are modified to add or delete constants or the diagnostic code is in an abbreviated dump mode, the amount of memory to be allocated will be calculated accurately.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of executing a hardware dump, comprising:
   identifying a set of hardware dump information elements to collect, wherein identifying a set of hardware dump information elements comprises determining a dump mode and identifying a set of static arrays;

calculating an amount of memory to allocate for a dump list based on the dump mode and sizes of the set of static arrays;

allocating the calculated amount of memory; and building the dump list in the allocated memory.

2. The method of claim 1, further comprising:

collecting the hardware dump information elements; and saving the collected hardware dump information elements in memory.

3. The method of claim 2, wherein the step of building the dump list comprises iterating through the set of static arrays.

4. The method of claim 2, wherein the collecting step comprises collecting hardware dump data for each entry of the dump list from each component to be scanned.

5. The method of claim 1, wherein the set of static arrays is a complete set of static arrays if the dump mode is a complete dump.

6. The method of claim 1, wherein the set of static arrays is a subset of static arrays if the dump mode is an abbreviated dump.

7. The method of claim 1, wherein the set of static arrays comprises a component static array for each component to be scanned.

8. The method of claim 7, wherein each component static array comprises a set of constants, each constant representing a hardware dump information element to be collected.

9. The apparatus of claim 1, wherein the hardware dump information elements comprises at least one of a scan ring, a trace array, cache contents, and cache directory contents.

10. An apparatus for executing a hardware dump, comprising:

a memory; and a processor, coupled to the memory, wherein the processor identifies a set of hardware dump information elements to collect; calculates an amount of memory to allocate for a dump list based on the identified set of hardware dump information elements; allocates a portion of the memory corresponding to the calculated amount; and builds the dump list in the allocated portion of the memory, wherein the processor identifies the set of hardware dump information elements by determining a dump mode and identifying a set of static arrays, and wherein the processor calculates the amount of memory to allocate is calculated based on the dump mode and sizes of the set of static arrays.

11. The apparatus of claim 10, wherein the processor further collects the hardware dump information elements; and saves the collected hardware dump information elements in the memory.

12. The apparatus of claim 11, wherein the processor collects the hardware dump information elements by collecting hardware dump data for each entry of the dump list from each component to be scanned.

13. The apparatus of claim 10, wherein the processor identifies a complete set of static arrays if the dump mode is a complete dump and identifies the set of hardware dump information elements using the complete set of static arrays.

14. The apparatus of claim 10, wherein the processor identifies a subset of static arrays if the dump mode is an abbreviated dump and identifies the set of hardware dump information elements using the subset of static arrays.

15. The apparatus of claim 10, wherein the processor builds the dump list by iterating through the set of static arrays.

16. The apparatus of claim 10, wherein the set of static arrays comprises a component static array for each component to be scanned.

17. The apparatus of claim 16, wherein each component static array comprises a set of constants, each constant representing a hardware dump information element to be collected.

18. The apparatus of claim 10, wherein the hardware dump information elements comprises at least one of a scan ring, a trace array, cache contents, and cache directory contents.

19. A computer program product, in a computer readable medium, for executing a hardware dump, comprising:

instructions for identifying a set of hardware dump information elements to collect, wherein instructions for identifying a set of hardware dump information elements comprises instructions for determining a dump mode and identifying a set of static arrays;

instructions for calculating an amount of memory to allocate for a dump list based on the dump mode and sizes of the set of static arrays;

instructions for allocating the calculated amount of memory; and instructions for building the dump list in the allocated memory.

* * * * *

UNITED STATES PATENT AND TRADEMARK OFFICE
CERTIFICATE OF CORRECTION

| | | |
|---|---|---|
| PATENT NO. | : 6,898,736 B2 | Page 1 of 1 |
| APPLICATION NO. | : 10/001749 | |
| DATED | : May 24, 2005 | |
| INVENTOR(S) | : Chatterjee et al. | |

It is certified that error appears in the above-identified patent and that said Letters Patent is hereby corrected as shown below:

Col. 5, line 27: before "of" delete "apparatus" and insert --method--.

Signed and Sealed this

Twenty-first Day of November, 2006

JON W. DUDAS
*Director of the United States Patent and Trademark Office*